US012043203B2

(12) United States Patent
Tachikawa (10) Patent No.: US 12,043,203 B2
(45) Date of Patent: Jul. 23, 2024

(54) VEHICLE FRONT PASSENGER SEAT AIRBAG DEVICE

(71) Applicant: TOYOTA JIDOSHA KABUSHIKI KAISHA, Aichi-ken (JP)

(72) Inventor: Ken Tachikawa, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/343,742

(22) Filed: Jun. 29, 2023

(65) Prior Publication Data
US 2024/0034267 A1 Feb. 1, 2024

(30) Foreign Application Priority Data
Aug. 1, 2022 (JP) ................. 2022-122995

(51) Int. Cl.
*B60R 21/2346* (2011.01)
(52) U.S. Cl.
CPC ................. *B60R 21/2346* (2013.01)
(58) Field of Classification Search
CPC .................. B60R 21/2346; B60R 21/205
See application file for complete search history.

(56) References Cited

U.S. PATENT DOCUMENTS

| | | | | |
|---|---|---|---|---|
| 7,530,597 B2 * | 5/2009 | Bito | ...................... | B60R 21/233 280/743.1 |
| 2006/0006633 A1 * | 1/2006 | Bito | ................... | B60R 21/2346 280/740 |
| 2009/0146404 A1 * | 6/2009 | Furuno | ............... | B60R 21/2346 280/732 |
| 2010/0213692 A1 | 8/2010 | Nagai et al. | | |
| 2013/0154244 A1 * | 6/2013 | Miyata | ................ | B60R 21/2346 280/730.1 |
| 2014/0339798 A1 * | 11/2014 | Motomochi | .......... | B60R 21/205 280/732 |
| 2021/0061216 A1 * | 3/2021 | Ito | ......................... | B60R 21/205 |

FOREIGN PATENT DOCUMENTS

| | | | | |
|---|---|---|---|---|
| DE | 4442118 A1 * | 6/1995 | ........... | B60R 21/233 |
| DE | 19856407 A1 * | 6/1999 | ......... | B60R 21/2171 |
| GB | 2265118 A * | 9/1993 | ........... | B60R 21/233 |
| JP | 3399320 B2 * | 4/2003 | ......... | B60R 21/2346 |
| JP | JP-WO2006003748 A1 * | 4/2008 | | |

(Continued)

*Primary Examiner* — Nicole T Verley
(74) *Attorney, Agent, or Firm* — HAUPTMAN HAM, LLP (57) ABSTRACT

A vehicle front passenger seat airbag device comprises an airbag body is inflated and deployed by gas ejected from an inflator, a flow regulating cloth that is provided in a tubular shape including opening portions opening at left and right sides into an interior of the airbag body, that includes an inlet port at a peripheral surface of the flow regulating cloth for introducing the gas ejected from the inflator, and that is configured to distribute the gas introduced from the inlet port through the opening portions toward left and right sides of the interior of the airbag body, and a sewn portion configured by at least one portion of the flow regulating cloth of a portion further toward an upper portion side or a portion further toward a lower portion side than the inlet port, being sewn to the airbag body along a left-right direction.

3 Claims, 11 Drawing Sheets (56) References Cited

FOREIGN PATENT DOCUMENTS

| JP | 2010-195280 A | | 9/2010 | |
|----|---------------|---|--------|---|
| JP | 2012-148628 A | | 8/2012 | |
| JP | 2012-179952 A | | 9/2012 | |
| JP | 5201090 B2 | * | 6/2013 | ........... B60R 21/235 |
| JP | 2014051152 A | * | 3/2014 | |
| JP | 2015067217 A | * | 4/2015 | ........... B60R 21/205 |
| JP | 6143542 B2 | * | 6/2017 | |
| JP | 2019038399 A | * | 3/2019 | |
| JP | 2020-055369 A | | 4/2020 | |
| WO | WO-2012096292 A1 | * | 7/2012 | ........... B60R 21/205 |
| WO | WO-2013038827 A1 | * | 3/2013 | ........... B60R 21/205 |

* cited by examiner

VEHICLE FRONT PASSENGER SEAT AIRBAG DEVICE

CROSS-REFERENCE TO RELATED APPLICATION

This application is based on and claims priority under 35 USC 119 from Japanese Patent Application No. 2022-122995 filed on Aug. 1, 2022, the disclosure of which is incorporated by reference herein.

BACKGROUND

Technical Field

The present disclosure relates to a vehicle front passenger seat airbag device.

Related Art

Front passenger seat airbag devices that, in a case in which an airbag is being inflated and deployed, suppress the head of a dummy from being tilted forward by a front flap covering a bulge side of an airbag from an upper side to a lower side, and that suppress the dummy head from suddenly being tilted backward by a rear flap that covers the bulge side of an airbag from a lower side to an upper side, are known hitherto as in, for example, the technology disclosed in Japanese Patent Application Laid-Open (JP-A) No. 2012-148628.

However, in case in which an instrument panel has been made thinner (a length in a height direction of the instrument panel has been reduced) such as in an electric car (BEV), this results in a layout in which the airbag device is disposed more toward the passenger. In such case there is no room to adjust the deployment direction of flaps as described above.

Moreover, in a case in which an airbag has been deployed for example in a collision by a vehicle being rear-ended while stationary, there is a concern that a flow regulating cloth provided inside the airbag and inflating with a high internal pressure at initial deployment might forcibly press the chest of a passenger through the airbag.

Namely, while a vehicle is stationery a passenger might not always be seated with a correct posture with respect to a seat, and there is a concern that the passenger might sustain an injury from the flow regulating cloth inflating with a high internal pressure at the initial deployment were the airbag to be deployed when the chest of the passenger was in the vicinity of the instrument panel.

Particularly in case in which the passenger is a child (for example a three year old infant), then when not seated in the correct posture with respect to the seat a contact quantity (interference quantity of overlap in the vehicle front-rear direction in side view along the vehicle width direction), through the airbag, against the high internal pressure flow regulating cloth is large. There is accordingly a concern of excessive load being applied by the airbag (flow regulating cloth) to an adult or to a child passenger not sitting in the correct posture.

SUMMARY

The present disclosure accordingly obtains a vehicle front passenger seat airbag device capable of suppressing excessive load from being applied to a passenger.

A vehicle front passenger seat airbag device of a first aspect according to the present disclosure includes an airbag body, a flow regulating cloth, and a sewn portion. The airbag body is housed in a vehicle rear side end portion on a front passenger seat side of an instrument panel, and is configured to be inflated and deployed toward a vehicle rear side from an aperture of the instrument panel by gas ejected from an inflator. The flow regulating cloth is provided in a tubular shape including opening portions opening at left and right sides into an interior of the airbag body, includes an inlet port at a peripheral surface of the flow regulating cloth for introducing the gas ejected from the inflator, and is configured to distribute the gas introduced from the inlet port through the opening portions toward left and right sides of the interior of the airbag body. The sewn portion is configured by at least one portion of the flow regulating cloth from among a portion further toward an upper portion side or a portion further toward a lower portion side than the inlet port, being sewn to the airbag body along a left-right direction.

In the first aspect, the inflator is actuated in a case in which a vehicle has a collision (or rear-ending), and the airbag body is inflated and deployed while gas ejected from the inflator passes through the flow regulating cloth and is distributed toward left and right sides of the interior of the airbag body. However in a case in which, for example, a three year old infant child passenger is not be seated with a correct posture with respect to a seat (front passenger seat), then there is case in which the chest of the child passenger is at a position facing the flow regulating cloth.

However, the at least one portion of the flow regulating cloth from among the portion further toward an upper portion side or the portion further toward a lower portion side than the inlet port is sewn to the airbag body along the left-right direction. The projection quantity toward the vehicle rear side of the flow regulating cloth is accordingly reduced, and the thickness of the flow regulating cloth in the vehicle front-rear direction is reduced. Thus for such a child passenger the contact quantity (interference quantity) against the high internal pressure flow regulating cloth through the airbag body is reduced. Namely, excessive load is suppressed from being applied to the passenger.

Moreover, a vehicle front passenger seat airbag device of a second aspect according to the present disclosure is the vehicle front passenger seat airbag device of the first aspect, wherein the sewn portion is formed at a left-right direction central portion of the flow regulating cloth.

In the second aspect the sewn portion is formed at the left-right direction central portion of the flow regulating cloth. This means that the projection quantity (thickness in the vehicle front-rear direction) toward the vehicle rear side at the left-right direction central portion of the flow regulating cloth is reduced while suppressing the deployment behavior of the flow regulating cloth from becoming unstable when being inflated and deployed by instantaneously being supplied with the gas. Thus, for example for such a child passenger, the contact quantity (interference quantity) against the high internal pressure flow regulating cloth through the airbag body is more effectively reduced, and excessive load is more effectively suppressed from being applied to the passenger.

Moreover, a vehicle front passenger seat airbag device of a third aspect according to the present disclosure is the vehicle front passenger seat airbag device of the first aspect or the second aspect, wherein in a case in which the flow regulating cloth is being deployed, a vehicle rear side end portion of each of the opening portions is positioned further toward the vehicle rear side than the vehicle rear side end portion of the instrument panel.

In the third aspect, in a case in which the flow regulating cloth is being deployed the vehicle rear side end portion of each of the opening portions is positioned further toward the vehicle rear side than the vehicle rear side end portion of the instrument panel. The gas is accordingly distributed effectively from the opening portions of the flow regulating cloth toward the left and right sides of the interior of the airbag body. This enables more effective role to be taken in the deployment performance of the airbag body.

Moreover, a vehicle front passenger seat airbag device of a fourth aspect according to the present disclosure is the vehicle front passenger seat airbag device of the third aspect wherein in case in which the sewn portion is sewn further to an upper portion side than the inlet port the sewn portion is formed at a position 30 mm upward or a position 30 mm downward from an upper edge of the aperture, and in case in which the sewn portion is sewn further to a lower portion side than the inlet port the sewn portion is formed at a position 30 mm downward or a position 30 mm upward from a lower edge of the aperture.

In the fourth aspect, the sewn portion is formed at the position 30 mm upward or the position 30 mm downward from the upper edge of the aperture in a case in which the sewn portion is sewn further to an upper portion side than the inlet port, and the sewn portion is formed at the position 30 mm downward or the position 30 mm upward from the lower edge of the aperture in a case in which the sewn portion is sewn further to a lower portion side than the inlet port. This accordingly means that the projection quantity (thickness in the vehicle front-rear direction) toward the vehicle rear side of the flow regulating cloth is more effectively reduced, and excessive load is more effectively suppressed from being applied to the passenger, than in case in which the sewn portion further to the upper portion side than the inlet port is not formed at the position 30 mm upward or the position 30 mm downward from the upper edge of the aperture and the sewn portion further to the lower portion side than the inlet port is not formed at the position 30 mm downward or the position 30 mm upward from the lower edge of the aperture.

Moreover, a vehicle front passenger seat airbag device of a fifth aspect according to the present disclosure is the vehicle front passenger seat airbag device of the fourth aspect, wherein, in a side view, the instrument panel is formed with a length in a vehicle height direction that is shorter than a length in a vehicle front-rear direction.

In the fifth aspect, in side view the instrument panel is formed with a length in the vehicle height direction that is shorter than a length in the vehicle front-rear direction. Thus although the airbag body and the flow regulating cloth are disposed toward the passenger side, the projection quantity (thickness in the vehicle front-rear direction) toward the vehicle rear side of the flow regulating cloth is reduced, and so the passenger is effectively restrained by the airbag body while suppressing excessive load from being applied to the passenger.

As described above, the present disclosure enables excessive load to be suppressed from being applied to a passenger in a vehicle front passenger seat airbag device.

BRIEF DESCRIPTION OF THE DRAWINGS

Exemplary embodiments of the present invention will be described in detail based on the following figures, wherein.

DETAILED DESCRIPTION

Detailed description follows regarding an exemplary embodiment according to the present disclosure, with reference to the drawings. Note that for ease of explanation, in the drawings an arrow UP indicates a vehicle up direction, an arrow FR indicates a vehicle front direction, and an arrow RH indicates a vehicle right direction. Thus unless specified otherwise, in the following description reference to up-down, front-rear, and left-right directions indicate vehicle up-down, front-rear, and left-right directions. The left-right direction has the same definition as vehicle width direction.

Figure 1:
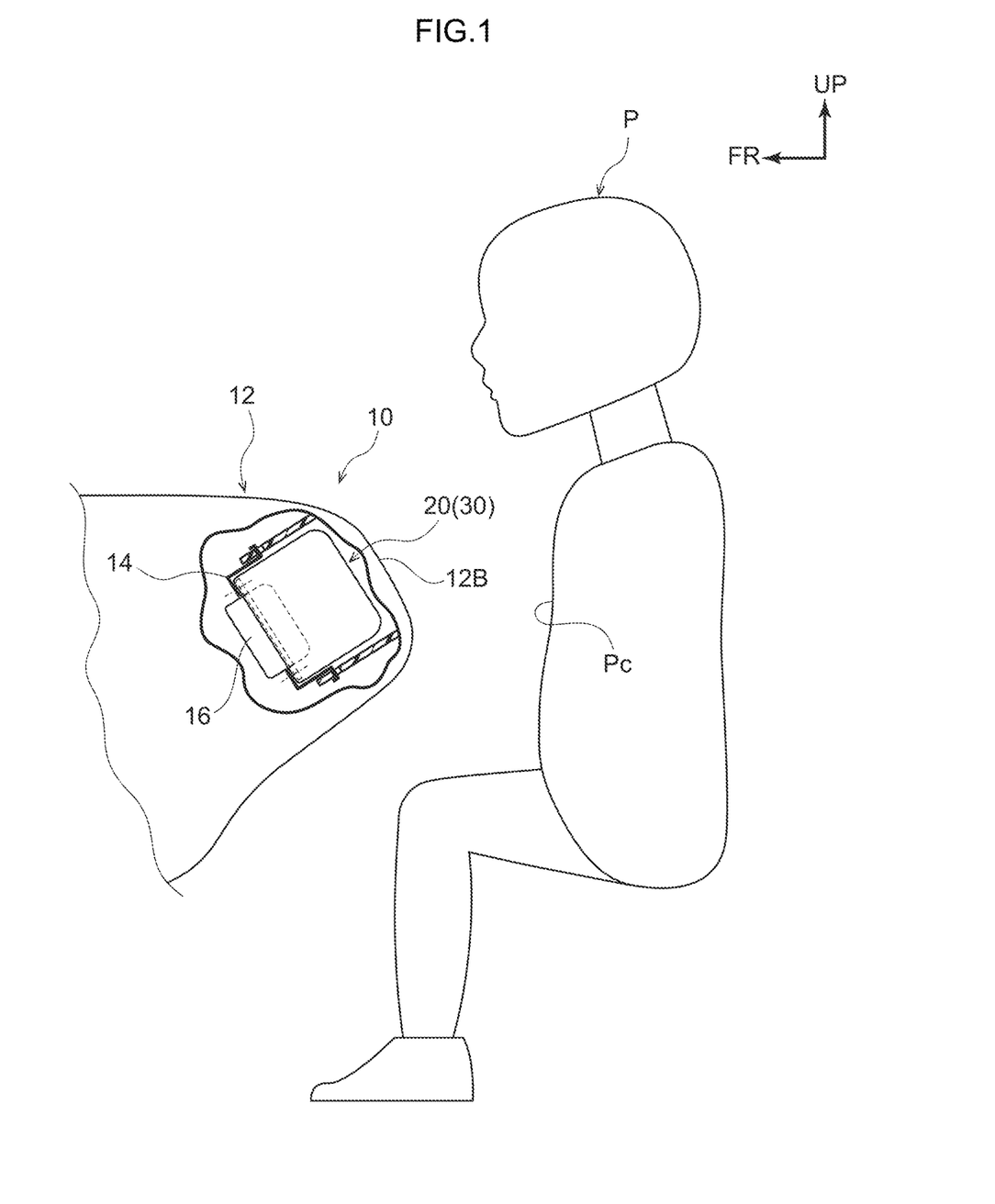
FIG. 1 is a schematic side view illustrating a vehicle front passenger seat airbag device according to an exemplary embodiment, together with a child passenger.

As illustrated in FIG. 1, a vehicle front passenger seat airbag device (hereafter referred to as "airbag device") 10 according to the present exemplary embodiment is, as an example, provided to a right hand drive vehicle (omitted in the drawings). Namely, the airbag device 10 is housed inside an instrument panel 12 made from resin at a left front seat side of a vehicle, i.e. the front passenger seat side.

Note that vehicles to which the airbag device 10 according to the present exemplary embodiment are applied are mainly electric cars (battery electric vehicles (BEV)). An engine compartment is shrunk in a battery electric vehicle and the cabin thereof is enlarged. This means that there is a tendency for a height direction length (height) of the instrument panel 12 to be formed shorter than a front-rear direction length in side view along the vehicle width direction.

Namely, the instrument panel 12 tends to be thinned by reducing the height direction length (height) in side view. Thus the airbag device 10 is housed in a rear end portion 12B of the instrument panel 12. Moreover, the rear end portion 12B of the instrument panel 12 is sometimes positioned at a front side of a chest Pc of a child passenger P (for example, a passenger equivalent to a three year old infant dummy) in case in which the child passenger P is not seated with a correct posture with respect to a front passenger seat (seat).

The airbag device 10 is equipped with a single inflator 16 supported by a support member 14 provided inside the instrument panel 12. The inflator 16 is configured so as to instantaneously eject (supply) gas into an airbag body 20, described later, through the inside of a flow regulating cloth 30, described later.

The inflator 16 is electrically connected to a detection device (omitted in the drawings) such as an acceleration sensor provided to the vehicle, and the inflator 16 is actuated by a collision (or rear-ending) of the vehicle being detected by this detection device, in a configuration such that gas is instantaneously ejected into the flow regulating cloth 30 (into the airbag body 20).

Note that an aperture 12A (see FIG. 2)) for inflating and deploying the airbag body 20 toward the rear is formed in the rear end portion 12B of the instrument panel 12, and the aperture 12A is closed off by a door portion (omitted in the drawings) configured integrally to the instrument panel 12. The door portion is configured so as to be ruptured by the flow regulating cloth 30 and the airbag body 20 as they are inflated and deployed by actuation of the inflator 16.

Figure 2:
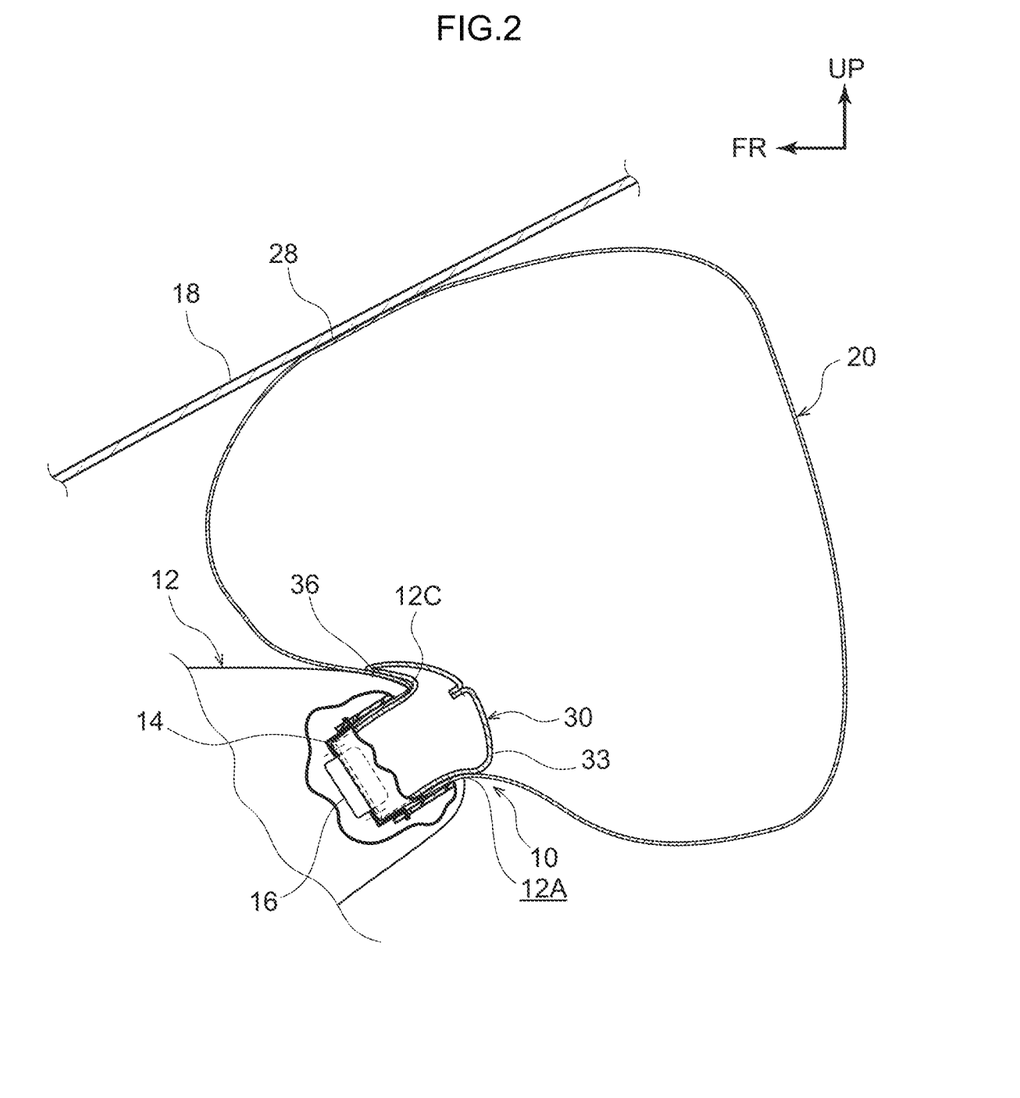
FIG. 2 is a schematic side view illustrating a state in a case in which a flow regulating cloth and an airbag body of a vehicle front passenger seat airbag device according to the present exemplary embodiment have been inflated and deployed.

Moreover, as illustrated in FIG. 2, the airbag device 10 is equipped with the airbag body 20 made from cloth that is inflated and deployed toward the rear from the aperture 12A of the instrument panel 12 by gas ejected from the inflator 16. Note that the passenger P seated in the front passenger seat is omitted in FIG. 2 in order to illustrate the shape of the airbag body 20 and the flow regulating cloth 30, described later, in a case in which they have been inflated and deployed.

Figure 3:
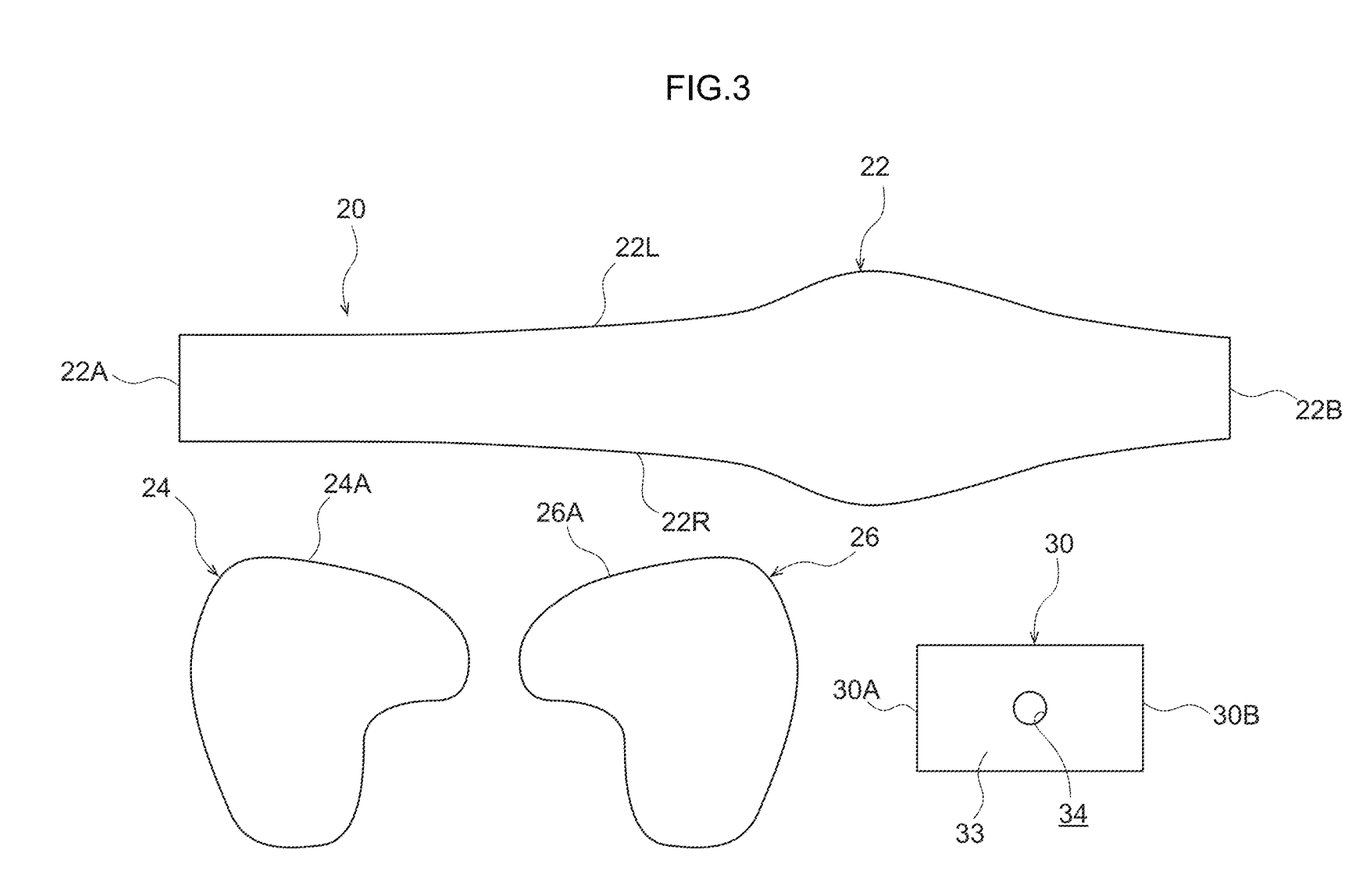
FIG. 3 is an opened out view illustrating a flow regulating cloth and an airbag body of a vehicle front passenger seat airbag device according to the present exemplary embodiment.

As illustrated in FIG. 3, the airbag body 20 is configured by a main panel 22 formed in a substantially tubular shape and arranged along a front-rear direction, and by a left face panel 24 and a right face panel 26 that have left-right symmetrical shapes to each other and close off both the left and right direction sides of the substantially tubular shaped main panel 22, so as to form a bag shape.

To describe in more detail, the main panel 22 has a length direction one end portion 22A and other end portion 22B configured so as to form a substantially tubular shape by each being fixed to the support member 14. A peripheral edge 24A of the left face panel 24 and a peripheral edge 26A of the right face panel 26 are then attached to a left peripheral edge 22L and a right peripheral edge 22R of the main panel 22 by being respectively sewn thereto. The airbag body 20 is thereby configured so as to be formed in a bag shape.

As illustrated in FIG. 2, part of an outer face (a face on the opposite side to the passenger restraining face) of a front wall 28 of the inflated and deployed airbag body 20 contacts an inner face of a front windshield glass 18 with a specific pressure, and is pressed relatively rearward by the front windshield glass 18 (a reaction force is obtained from the front windshield glass 18).

Note that there is a vent hole (omitted in the drawings) respectively formed in the left face panel 24 and the right face panel 26 of the airbag body 20 to discharge gas after the passenger P has been restrained. A width (a length along the left-right direction) of the airbag body 20 is set with a degree of width so as to stick out toward the left-right direction outside of both knees of an adult passenger (for example, a passenger equivalent to an adult dummy AM50: omitted in the drawings). The airbag body 20 is configured such that the airbag body 20 is housed inside the rear end portion 12B of the instrument panel 12 in a folded up state folded up in a specific fold-up direction.

Figure 6:
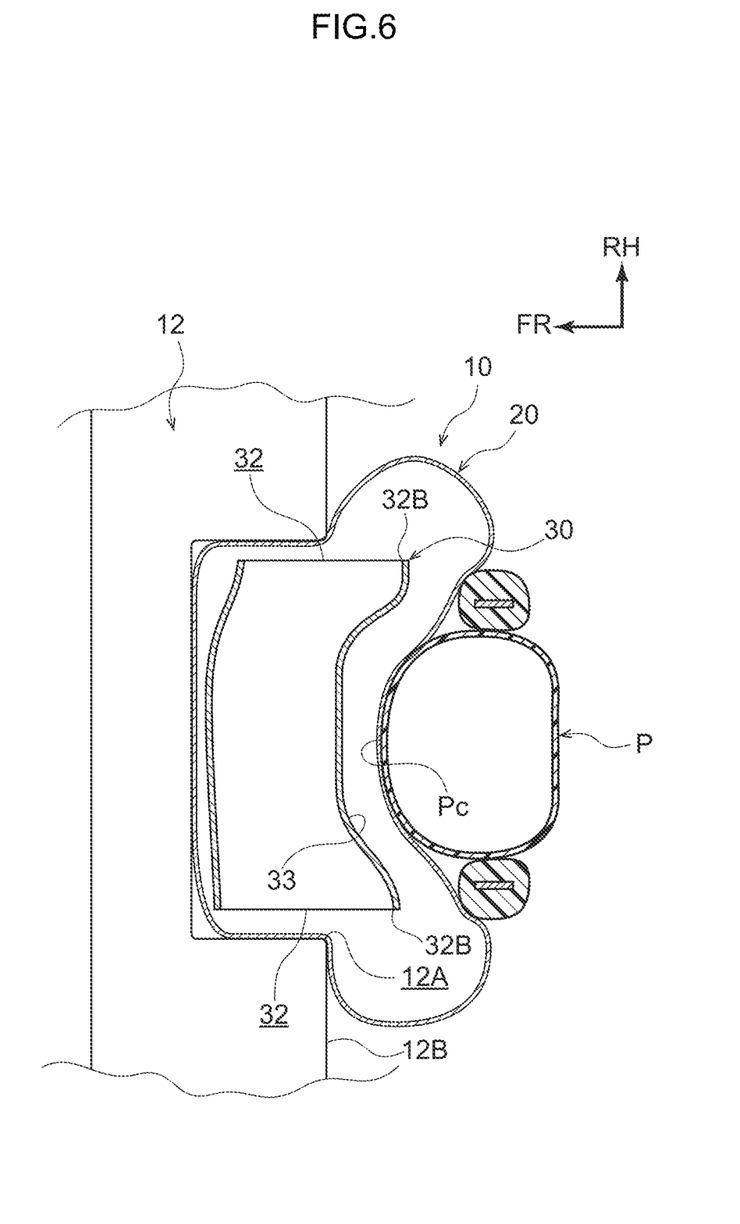
FIG. 6 is a schematic plan view cross-section illustrating a state partway through deployment of a flow regulating cloth and an airbag body of a vehicle front passenger seat airbag device according to the present exemplary embodiment.

Moreover, as illustrated in FIG. 2, the airbag device 10 is equipped with the flow regulating cloth 30 made from cloth (made from a cloth material similar to that of the airbag body 20) at the instrument panel 12 side of the interior of the airbag body 20. As illustrated in FIG. 6, the flow regulating cloth 30 is provided so as to configure a tubular shape having a specific length and open at both the left and right sides when inflated and deployed by gas being ejected from the inflator 16.

Figure 4:
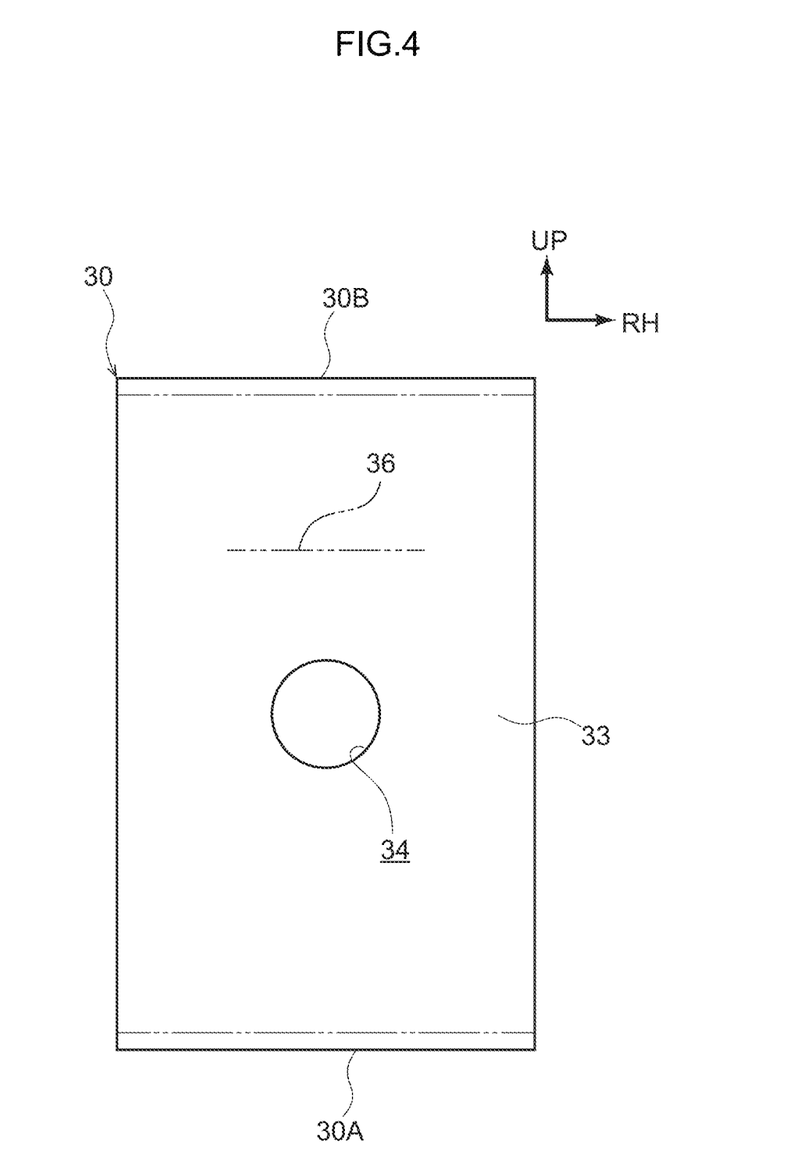
FIG. 4 is an opened out view illustrating sewn locations of a flow regulating cloth of a vehicle front passenger seat airbag device according to the present exemplary embodiment.

Namely, the flow regulating cloth 30 is configured so as to form a tubular shape having an axial direction (length direction) along the left-right direction by a length direction one end portion 30A and other end portion 30B illustrated in FIG. 3 and FIG. 4 thereof being sewn together. A configuration is thereby adopted in which an opening portion 32 (see FIG. 6) is formed at both the left and right direction sides of the flow regulating cloth 30 for supply of gas into the airbag body 20.

The flow regulating cloth 30 includes an inlet port 34 for introducing gas ejected from the inflator 16 into a left-right direction (axial direction) central portion of a peripheral surface 33 thereof. Namely, in the flow regulating cloth 30 the inlet port 34 is connected to an ejection port (omitted in the drawings) of the inflator 16, and a periphery of the inlet port 34 is also fixed to the one end portion 22A and the other portion 22B of the main panel 22 as well as to the support member 14.

The flow regulating cloth 30 thereby has a configuration in which gas introduced from the inlet port 34 (ejected into the inlet port 34) is distributed toward both the left and right direction sides of the interior of the airbag body 20. Note that in a case in which the flow regulating cloth 30 is being deployed, a rear end portion 32B of each of the opening portions 32 is configured so as to be positioned further rearward than the rear end portion 12B of the instrument panel 12 (see FIG. 6). Moreover, the flow regulating cloth 30 is also housed inside the rear end portion 12B of the instrument panel 12 in a folded up state folded in a specific fold-up direction together with the airbag body 20.

Moreover, as illustrated in FIG. 2 and FIG. 4, the airbag device 10 is equipped with a sewn portion 36 configured by a portion further to an upper portion side than the inlet port 34 of the flow regulating cloth 30 being sewn to the airbag body 20 along the left-right direction. The sewn portion 36 is formed only at a left-right direction (axial direction) central portion of the flow regulating cloth 30, and is not formed at the left-right direction (axial direction) end portions of the flow regulating cloth 30. A length of the sewn portion 36 is at least a left-right direction length of the chest Pc of the child passenger P (three year old infant dummy).

The sewn portion 36 is formed at a position 30 mm upward from an upper edge 12C of the aperture 12A of the instrument panel 12 in side view (a +30 mm position). Note that the sewn portion 36 is not limited to the embodiment formed at the illustrated position, and may be formed at a position 30 mm downward (at the inside of the instrument panel 12) from the upper edge 12C of the aperture 12A of the instrument panel 12 (a −30 mm position).

Description follows regarding the operation of the airbag device 10 according to the present exemplary embodiment configured as described above.

The inflator 16 is actuated in a case in which the detection device has detected that the vehicle has had a collision (or been rear-ended), and gas is instantaneously ejected (supplied) into the airbag body 20 through the interior of the flow regulating cloth 30. Namely, the airbag body 20 is inflated and deployed toward the rear side (the side of the passenger P). To describe in more detail, the gas ejected from the inflator 16 is first ejected (supplied) into the flow regulating cloth 30.

The gas that has been ejected (supplied) into the flow regulating cloth 30 passes through the interior of the regulating cloth 30, is ejected from the opening portions 32 formed at the left and right sides of the flow regulating cloth 30 (is distributed in the left and right directions), and is supplied into the airbag body 20. This means that by providing the flow regulating cloth 30 inside the airbag body 20, the behavior of the airbag body 20 can be suppressed from becoming unstable due to the high pressure of the instantaneously ejected gas compared to configurations in which the flow regulating cloth 30 is not provided inside the airbag body 20.

Moreover, in a case in which the flow regulating cloth 30 is being deployed as illustrated in FIG. 6, the rear end portion 32B of the opening portions 32 are positioned rearward of the rear end portion 12B of the instrument panel 12. Thus gas is able to be distributed more efficiently in the left and right directions inside the airbag body 20 from the opening portions 32 of the flow regulating cloth 30 than case in which the rear end portions 32B of the opening portion 32 are positioned at the same position as the rear end portion 12B of the instrument panel 12. This thereby enables a more effective role to be played in the deployment performance of the airbag body 20.

Moreover, as illustrated in FIG. 2, part of the outer face of the front wall 28 of the airbag body 20 contacts the inner face of the front windshield glass 18 at a specific pressure, and is pressed relatively rearward by the front windshield glass 18 (a reaction force is obtained from the front windshield glass 18).

Thus, for example, even though the airbag body 20 has been made more bulky as the instrument panel 12 has been thinned, the deployment behavior of the airbag body 20 can be more effectively suppressed from becoming unstable when instantaneously supplied with gas and inflated and deployed (the deployment behavior can be more effectively stabilized). This thereby enables the passenger P seated in the front passenger seat to be appropriately restrained.

Moreover, the sewn portion 36 is formed to the flow regulating cloth 30 by a portion further to an upper portion side than the inlet port 34 being sewn to the airbag body 20 along the left-right direction. Thus due to the sewn portion 36, the flow regulating cloth 30 in the vicinity of the sewn portion 36 moves together with the airbag body 20 partway through deployment of the flow regulating cloth 30 and the airbag body 20, and a projection height of the flow regulating cloth 30 with respect to the instrument panel 12 is suppressed. Thus, as illustrated in FIG. 5 and FIG. 6, even for a child passenger P equivalent to a three year old infant dummy for example, the chest Pc thereof is positioned facing the rear end portion 12B of the instrument panel 12 in the front-rear direction, and the peripheral surface 33 of the inflated and deployed flow regulating cloth 30 does not press the chest Pc through the airbag body 20.

Figure 9:
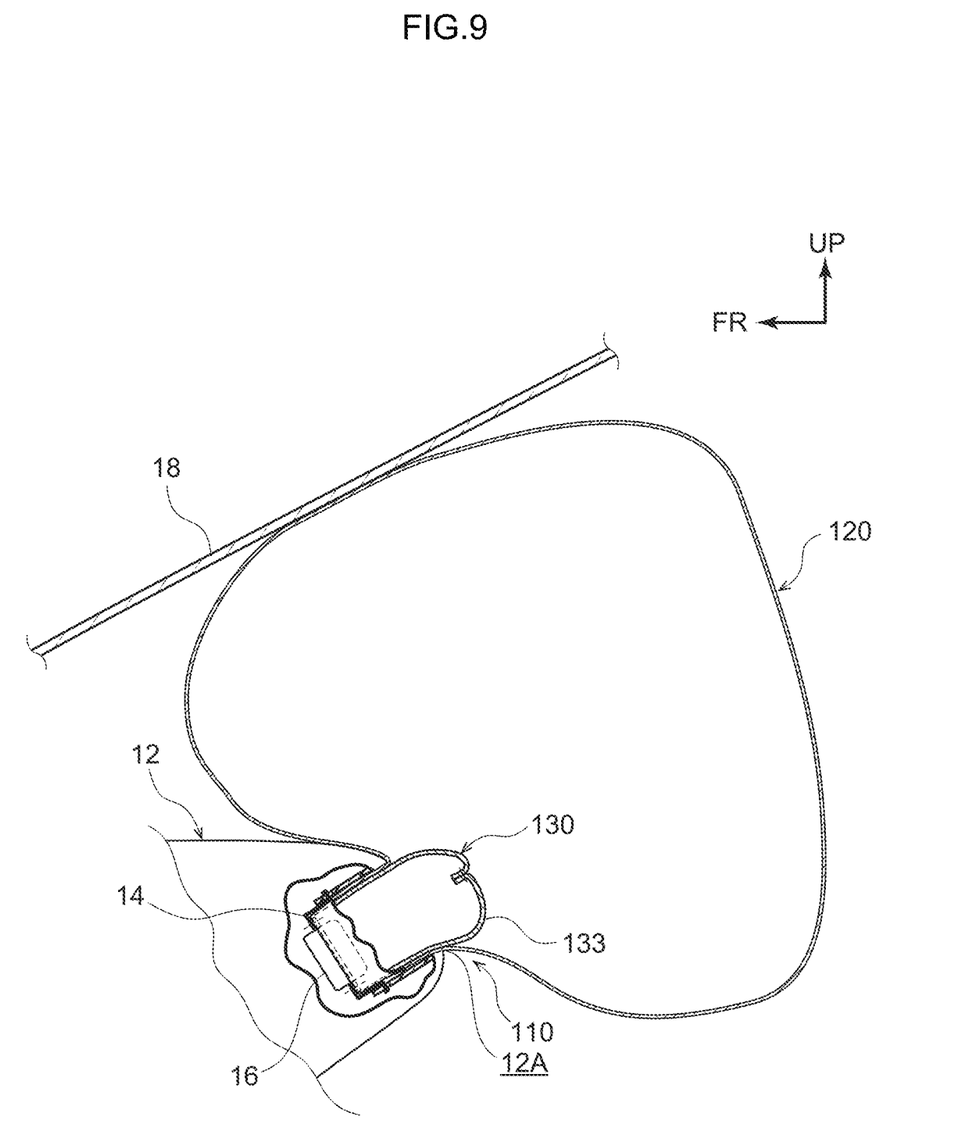
FIG. 9 is a schematic side view illustrating a state in a case in which a flow regulating cloth and an airbag body of a vehicle front passenger seat airbag device according to a comparative example have been inflated and deployed.

Description follows regarding an airbag device 110 according to a comparative example. As illustrated in FIG. 9, a flow regulating cloth 130 of this airbag device 110 is not provided with a sewn portion 36 (see FIG. 2 etc.) configured by sewing a portion further to an upper portion side than an inlet port (omitted in the drawings) to an airbag body 120 along the left-right direction.

Figure 10A:
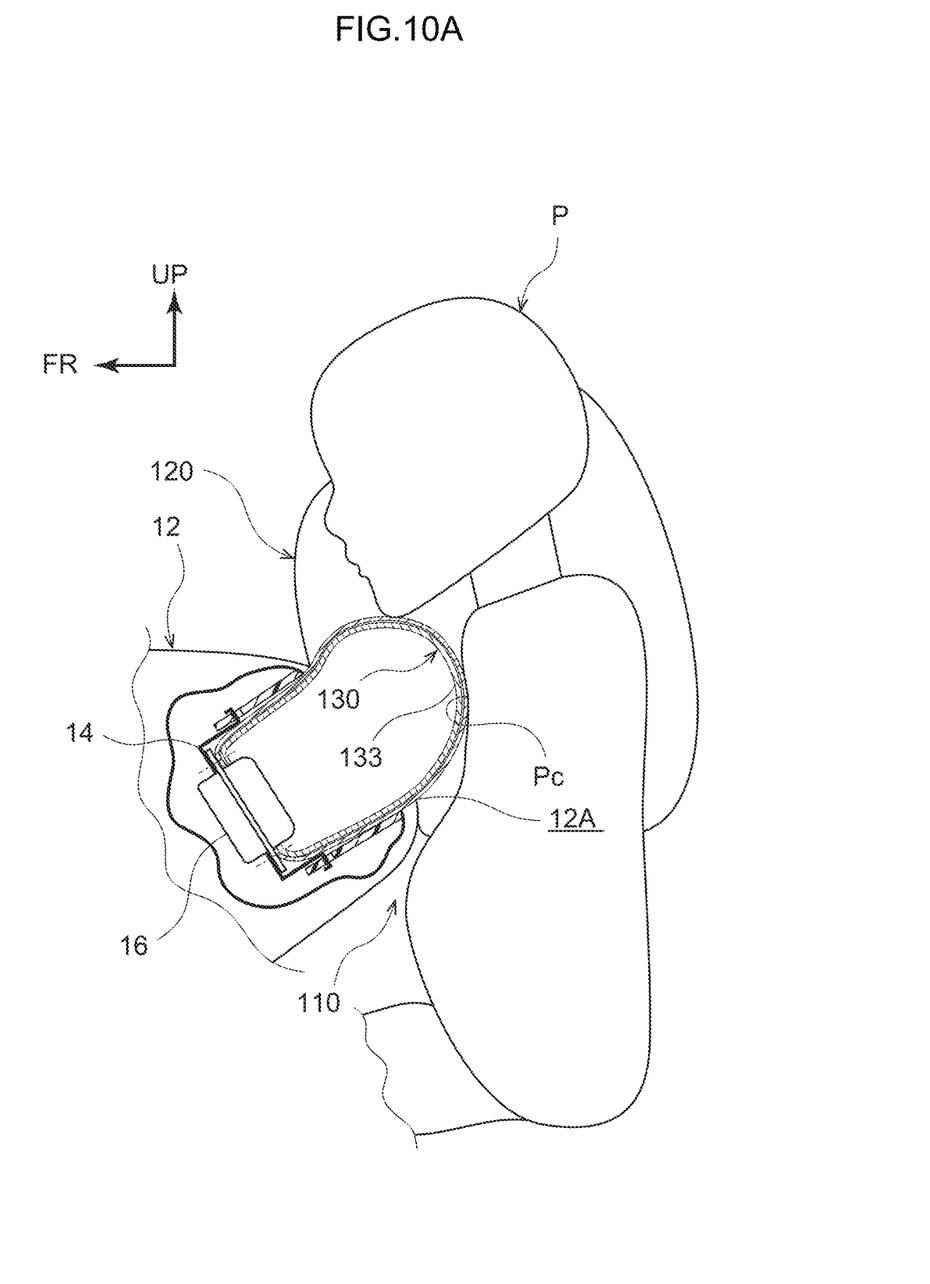
FIG. 10A is a schematic side view illustrating a state partway through deployment of a flow regulating cloth and an airbag body of a vehicle front passenger seat airbag device according to a comparative example.
Figure 10B:
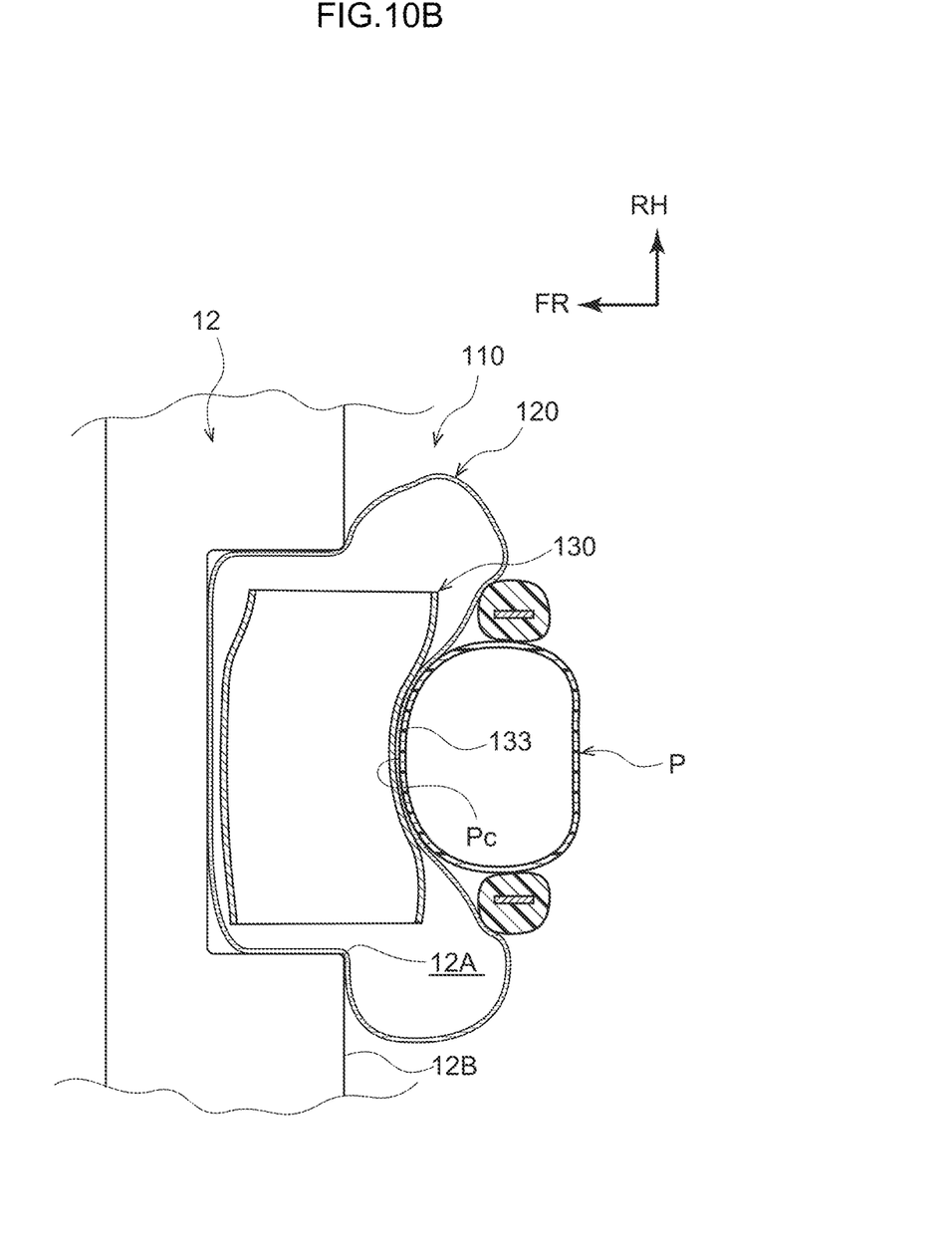
FIG. 10B is a schematic cross-section plan view illustrating a state partway through deployment of a flow regulating cloth and an airbag body of a vehicle front passenger seat airbag device according to a comparative example.

Thus, as illustrated in FIG. 10A and FIG. 10B, for a child passenger P equivalent to a three year old infant dummy, in a case in which the chest Pc thereof is present at a position facing the rear end portion 12B of the instrument panel 12 in the front-rear direction, a peripheral surface 133 of the inflated and deployed flow regulating cloth 130 presses the chest Pc through the airbag body 120.

Figure 5:
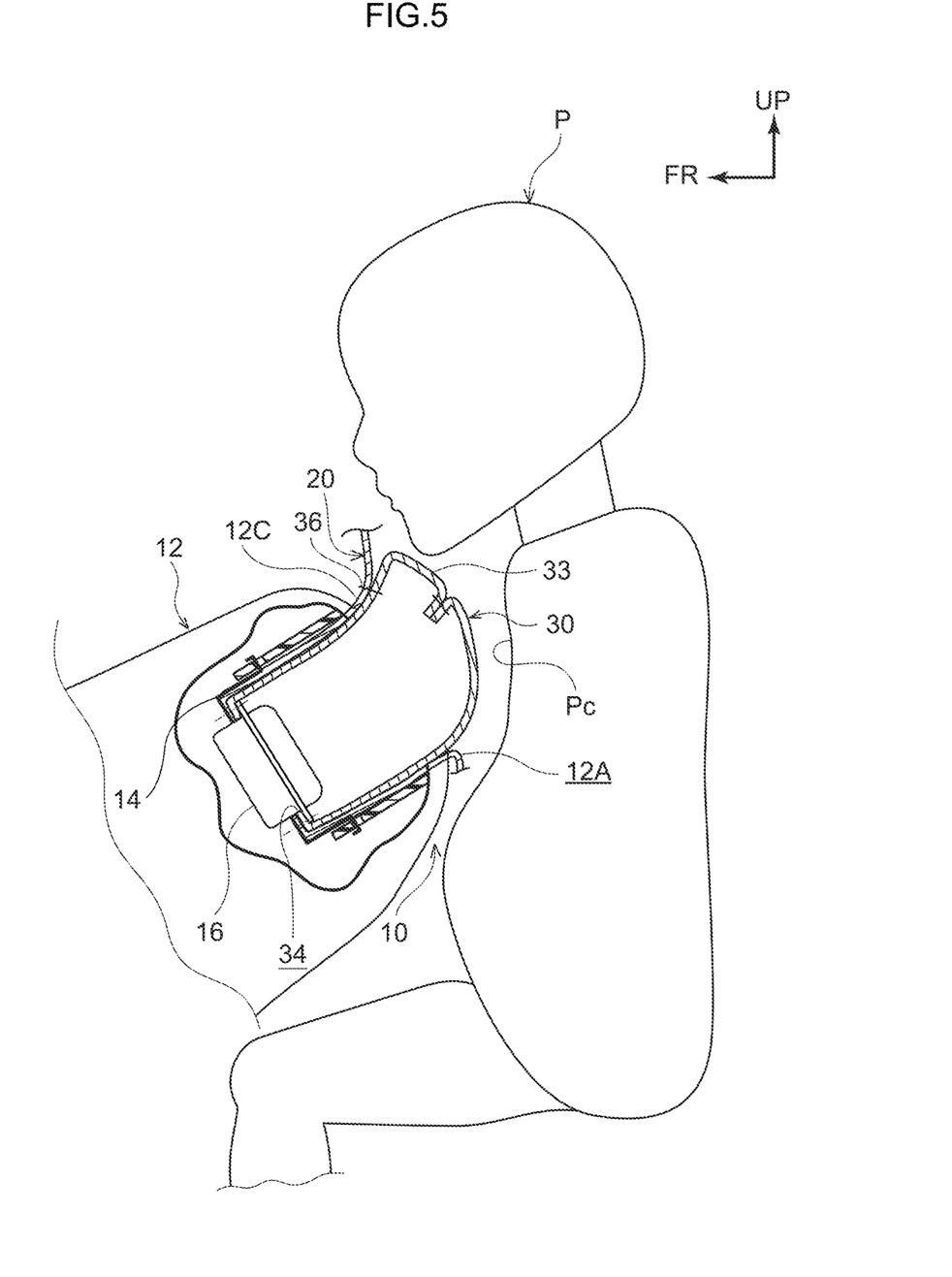
FIG. 5 is schematic side view illustrating a state partway through deployment of a flow regulating cloth and an airbag body of a vehicle front passenger seat airbag device according to the present exemplary embodiment.

In contrast thereto, in the airbag device 10 according to the present exemplary embodiment, as illustrated in FIG. 2 and FIG. 5, the sewn portion 36 is formed along the left-right direction further to the upper portion side than the inlet port 34 of the flow regulating cloth 30. This means that in a case in which the flow regulating cloth 30 has been inflated and deployed, a projection quantity thereof toward the rear side of the peripheral surface 33 can be reduced, enabling a thickness of the flow regulating cloth 30 itself to be reduced along substantially the front-rear direction.

Figure 7:
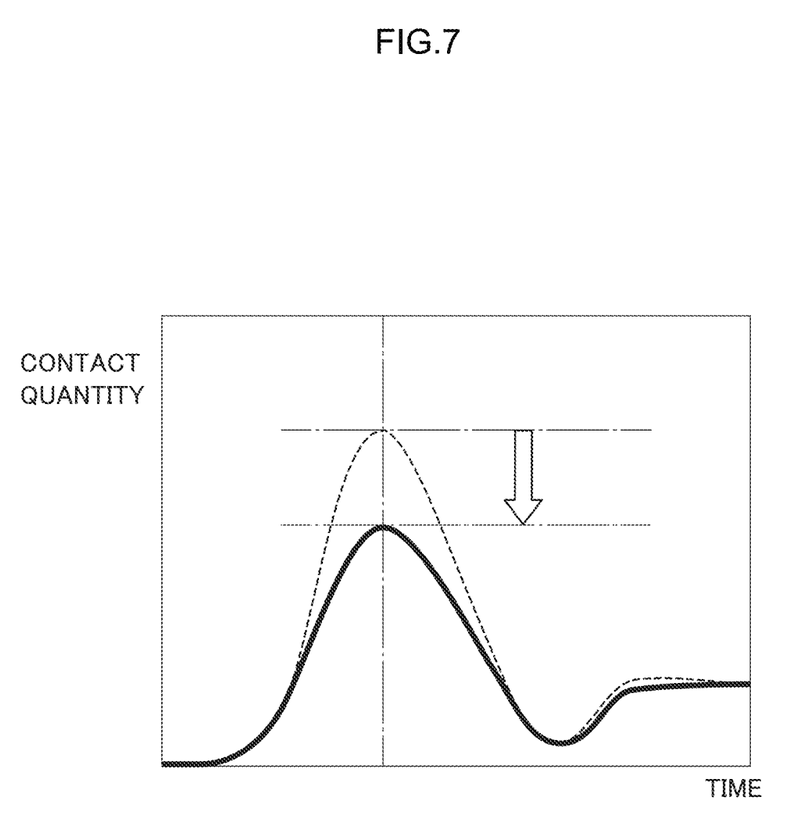
FIG. 7 is a graph illustrating a contact quantity to a passenger of a flow regulating cloth through an airbag body against elapsed time after inflator actuation of a vehicle front passenger seat airbag device according to the present exemplary embodiment, together with a comparative example thereof.

Thus, as illustrated in FIG. 7, for the child passenger P a contact quantity (interference quantity of overlap in the front-rear direction in side view: indicated by a solid line) against the high internal pressure flow regulating cloth 30 through the airbag body 20 arising from actuation of the inflator 16 can be reduced in comparison to the case of the airbag device 110 according to the comparative example (indicated by a broken line).

Namely, the airbag device 10 according to the present exemplary embodiment enables an excessively high load to be suppressed from being applied to the child passenger P. This thereby enables an injury severity score to the chest Pc, and furthermore to the neck, of the child passenger P to be reduced.

Moreover, as illustrated in FIG. 4, the sewn portion 36 is formed only at the left-right direction central portion of the flow regulating cloth 30 (i.e. is not formed at the left-right direction two end portions of the flow regulating cloth 30). This thereby enables the deployment behavior of the flow regulating cloth 30 to be suppressed from becoming unstable when instantaneously supplied with gas and inflated and deployed compared to case in which the sewn portion 36 is formed along the entire left-right direction (axial direction) of the flow regulating cloth 30, and also enables a drop in the effectiveness of flow regulation of gas flowing to the airbag body 20 to be suppressed from occurring.

Namely, the sewn portion 36 configured as described above enables a rearward projection quantity (a thickness in a substantially front-rear direction) at the left-right direction central portion of the flow regulating cloth 30 to be reduced while also suppressing a drop in the deployment performance of the airbag body 20 from occurring. Thus for the child passenger P, the contact quantity (interference amount) against the high internal pressure flow regulating cloth 30 through the airbag body 20 can be more effectively reduced, enabling excessive load to be more effectively suppressed from being applied to the child passenger P.

The length of the sewn portion 36 is set as at least the left-right direction length of the chest Pc of the child passenger P (three year old infant dummy). Thus in comparison to case in which the length of the sewn portion 36 is less than the left-right direction length at the chest Pc of the child passenger P (three year old infant dummy), the contact quantity (interference amount) at the child passenger P against the high internal pressure flow regulating cloth 30 through the airbag body 20 can be more effectively reduced, enabling excessive load to be more effectively suppressed from being applied to the child passenger P.

Furthermore, the sewn portion 36 is formed at a position 30 mm upward from the upper edge 12C of the aperture 12A of the instrument panel 12 (the +30 mm position) or at a position 30 mm downward therefrom (the −30 mm position). Thus the sewn portion 36 is able to more effectively reduce the rearward projection quantity (thickness in a substantially front-rear direction) of the flow regulating cloth 30 while maintaining deployment performance of the airbag body 20 and enables excessive load to be more effectively suppressed from being applied to the child passenger P, compared to case in which there is no sewn portion 36 formed at the position 30 mm upward from the upper edge 12C of the aperture 12A of the instrument panel 12 (the +30 mm position) or at a position 30 mm downward therefrom (the −30 mm position).

Moreover, the instrument panel 12 has a height direction length formed shorter than a front-rear direction length in side view. This means that although the airbag body 20 and the flow regulating cloth 30 are disposed toward the side of the passenger P, the rearward projection quantity (thickness in a substantially front-rear direction) of the flow regulating cloth 30 is reduced, and so the passenger P can be effectively restrained by the airbag body 20 while suppressing excessive load from being applied to the passenger P.

Modified Example

Figure 8:
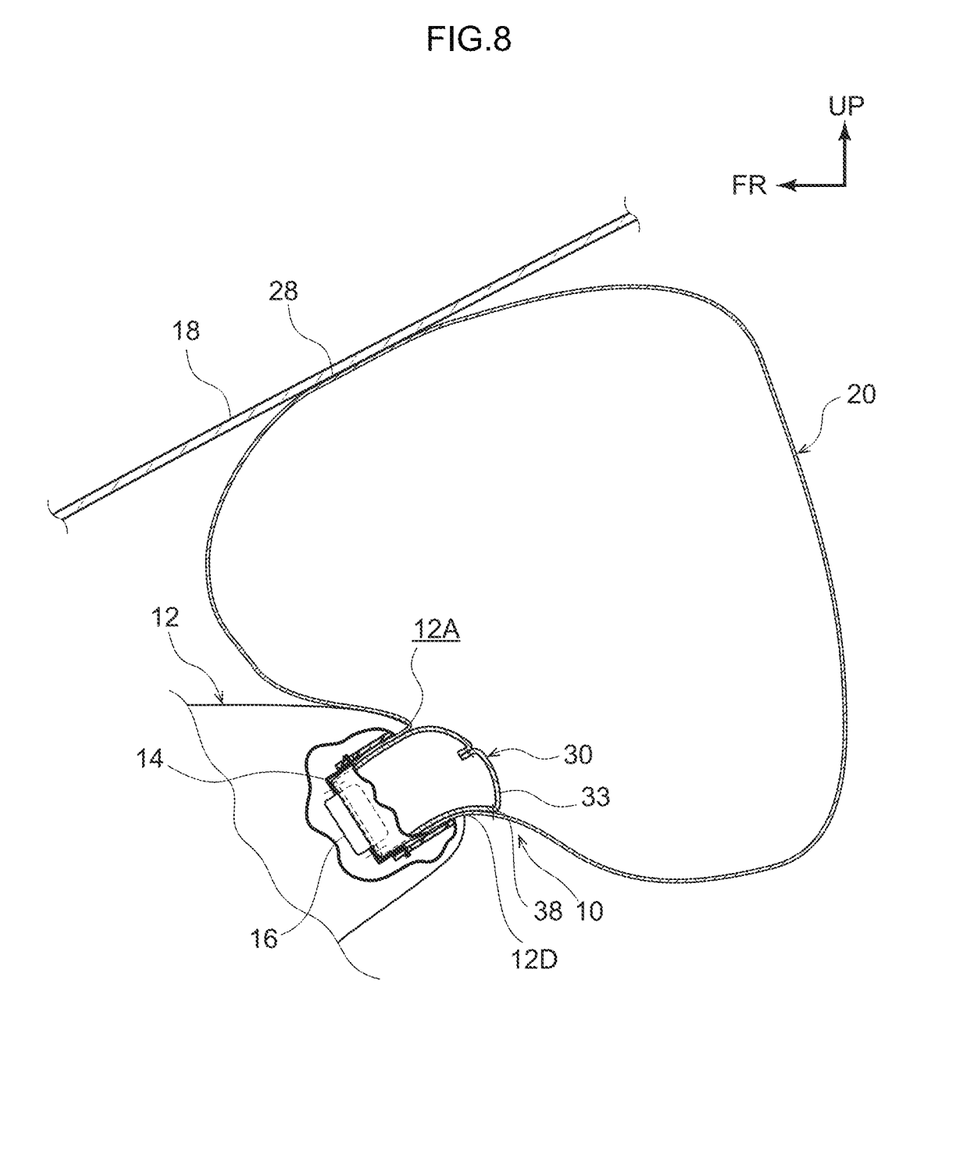
FIG. 8 is a schematic side view illustrating a state in a case in which a flow regulating cloth and an airbag body of a vehicle front passenger seat airbag device according to a modified example of the present exemplary embodiment have been inflated and deployed.

Note that, as illustrated in FIG. 8, instead of the sewn portion 36 configured as described above, the airbag device 10 may be provided with a sewn portion 38 configured by sewing a portion further to a lower portion side than an inlet port 34 of a flow regulating cloth 30 to the airbag body 20 by sewing along the left-right direction. This sewn portion 38 is also only formed at the left-right direction (axial direction) central portion of the flow regulating cloth 30, and is not formed at the left-right direction (axial direction) two end portions of the flow regulating cloth 30. The length of the sewn portion 38 is set as at least the left-right direction length of the chest Pc of the child passenger P (three year old infant dummy).

Moreover, the sewn portion 38 is formed at a position 30 mm downward from a lower edge 12D of the aperture 12A of the instrument panel 12 in side view (a +30 mm position). Note that the position of the sewn portion 38 is not limited to the illustrated position, and the sewn portion 38 may be formed at a position 30 mm upward from the lower edge 12D of the aperture 12A of the instrument panel 12 (toward the inside of the instrument panel 12) (a −30 mm position).

In a case in which the sewn portion 38 is formed in this manner at the position 30 mm downward from the lower edge 12D of the aperture 12A of the instrument panel 12 (the +30 mm position) or at the position 30 mm upward therefrom (the −30 mm position), the rearward projection quantity (thickness in a substantially front-rear direction) of the flow regulating cloth 30 can be more effectively reduced while maintaining the deployment performance of the airbag body 20 than case in which the sewn portion 38 is not formed at the position 30 mm downward from the lower edge 12D of the aperture 12A (the +30 mm position) or at the position 30 mm upward therefrom (the −30 mm position), and with this enabling excessive load to be more effectively suppressed from being applied to the child passenger P.

The vehicle front passenger seat airbag device 10 according to the present exemplary embodiment has been described with reference to the drawings, however the vehicle front passenger seat airbag device 10 according to the present exemplary embodiment is not limited by the drawings, and appropriate design modifications are possible thereto within a range not departing from the spirit of the present disclosure. For example, the inflator 16 may be configured so as to be actuated not only in a case in which a collision (or rear-ending) of the vehicle has been detected, but also in a case in which a collision (or rear-ending) of the vehicle is predicted by a collision prediction sensor or the like.

Moreover, both the sewn portion 36 at the upper portion side and the sewn portion 38 at the lower portion side may be formed to the flow regulating cloth 30. The sewn portion 36, 38 in the present exemplary embodiment may be formed by sewing at least one portion from among a portion further toward an upper portion side or a portion further toward a lower portion side than the inlet port 34 of the flow regulating cloth 30 to the airbag body 20 along the left-right direction. However, due to the side sewn portion 36 on the upper portion side having a better positional relationship with respect to the chest Pc of the child passenger P as described above, the sewn portion 36 has a greater effect in reducing the projection quantity of the flow regulating cloth 30 toward the chest Pc than the sewn portion 38 on the lower portion side.

Moreover, the passenger is not limited to being the child passenger P described above, and may be an adult passenger as described above. For example, the adult passenger might conceivably not be seated in a correct posture with respect to the front passenger seat while the vehicle is stationery. More specifically, the adult passenger might conceivably have removed their seatbelt and be lying down or the like in a state in which the chest of the passenger is in the vicinity of the instrument panel 12. Were the airbag body 20 to be deployed in such a state due to a rear-ending or the like, then there would be a concern that the passenger might sustain an injury from the high internal pressure flow regulating cloth 30 inflating at initial deployment.

However, the present exemplary embodiment is, as described above, equipped with the sewn portion 36, 38 where at least one portion from among the portion further toward an upper portion side or the portion further toward a lower portion side than the inlet port 34 of the flow regulating cloth 30 is sewn to the airbag body 20 along the left-right direction. This means that excessive load can be suppressed from being applied even, for example, to an adult passenger lying down in a state in which the chest of the passenger is in the vicinity of the instrument panel 12 (not seated in a correct posture).

What is claimed is:

1. A vehicle front passenger seat airbag device, comprising:

an airbag body housed in a vehicle rear side end portion on a front passenger seat side of an instrument panel, and configured to be inflated and deployed toward a vehicle rear side from an aperture of the instrument panel by gas ejected from an inflator;

a flow regulating cloth that is provided in a tubular shape including opening portions opening at left and right sides into an interior of the airbag body, that includes an inlet port at a peripheral surface of the flow regulating cloth for introducing the gas ejected from the inflator, and that is configured to distribute the gas introduced from the inlet port through the opening portions toward left and right sides of the interior of the airbag body; and a sewn portion configured by at least one portion of the flow regulating cloth from among a portion further toward an upper portion side or a portion further toward a lower portion side than the inlet port, being sewn to the airbag body along a left-right direction, wherein in a case in which the flow regulating cloth is being deployed, a vehicle rear side end portion of each of the opening portions is positioned further toward the vehicle rear side than the vehicle rear side end portion of the instrument panel, in a case in which the sewn portion is sewn further toward an upper portion side than the inlet port, the sewn portion is formed at a position 30 mm upward or a position 30 mm downward from an upper edge of the aperture; and in a case in which the sewn portion is sewn further toward a lower portion side than the inlet port, the sewn portion is formed at a position 30 mm downward or a position 30 mm upward from a lower edge of the aperture.

2. The vehicle front passenger seat airbag device of claim 1, wherein the sewn portion is formed at a left-right direction central portion of the flow regulating cloth.

3. The vehicle front passenger seat airbag device of claim 1, wherein, in a side view, the instrument panel is formed with a length in a vehicle height direction that is shorter than a length in a vehicle front-rear direction.

* * * * *